United States Patent Office 2,866,721
Patented Dec. 30, 1958

2,866,721

DISPERSION OF FLUOROCHLOROCARBON POLYMERS IN A SOLUTION OF A COPOLYMER OF TRIFLUOROCHLOROETHYLENE WITH A HALOGENATED OLEFIN AND METHOD OF COATING SURFACE THEREWITH

Alexander C. Hetherington, Berkeley Heights, N. J., assignor, by mesne assignments, to Minnesota Mining and Manufacturing Company, St. Paul, Minn., a corporation of Delaware No Drawing. Application March 15, 1955
Serial No. 494,561

15 Claims. (Cl. 117—103)

This invention relates to dispersions of high molecular weight polymers of perfluorochlorocarbons as the monomers. In one aspect this invention relates to dispersions or suspensions of the plastic polymers of the single monomer trifluorochloroethylene. In another aspect the invention relates to a method for applying plastic polymers of trifluorochloroethylene to surfaces.

Polymers of trifluorochloroethylene possess certain physical and chemical characteristics which make the polymers particularly desirable as surface coatings and impregnants. The plastic polymer produced from the single monomer trifluorochloroethylene is hard but not brittle and is flowable under pressure at temperatures above 225° C. The polymers of trifluorochloroethylene in general possess excellent mechanical properties, resistance to chemicals and oxidation, flame resistance, superior electrical properties and high working temperatures. Four-fifths of the weight of the polymer of the single monomer is made of the two halogens, fluorine and chlorine. The quick quenched plastic polymer is colorless and transparent. The polymer has a high chemical stability, no effect being observed on the polymer after prolonged exposure to concentrated sulfuric acid, hydrofluoric acid, hydrochloric acid, strong caustic, fuming nitric acid, aqua regia, and other vigorous oxidizing materials. The plastic polymer is flexible and resilient, has a high impact strength at low temperatures and is resistant to thermal shock. The polymer is not wetted by water and is unaffected by high humidity.

Normally solid polymers produced from the single monomer trifluorochloroethylene may be prepared by polymerizing the monomer in the presence of a suitable organic peroxide such as bistrichloroacetyl peroxide, as the polymerizing agent, at a temperature between about −20 and about 25° C., preferably at a temperature of about −16° C. At a temperature of −16° C. the polymerization of trifluorochloroethylene to a satisfactory yield of solid polymer is accomplished in about seven days. At elevated temperatures and at corresponding superatmospheric pressures less time is required to complete the polymerization. As this invention does not reside in the preparation of the polymer per se, further discussion thereof is deemed unnecessary.

As a result of the excellent chemical and physical properties of the polymer of trifluorochloroethylene, the polymers have use as coatings on various surfaces in order to make such surfaces corrosion resistant to chemicals. Because of the insolubility of the polymers of trifluorochloroethylene in most common solvents, and because of the low solids content of the polymer in other solvents, it has been found advantageous to coat surfaces with a dispersion of the trifluorochloroethylene in a non-solvent liquid. Among the non-solvent liquids which have been used are the aliphatic and aromatic ketones and esters and the glycols and glycol ethers. A complete description of dispersions of this type and of the methods of applying such dispersions to surfaces may be found in U. S. Patent 2,686,770 to Charles D. Dipner, and 2,686,738 to Wilber O. Teeters, both issued August 17, 1954.

The aforementioned dispersions are advantageous in many ways, but have certain disadvantages in that the wet dispersions applied to a surface by dip or flow coating have a tendency to run off easily and unevenly due to the low viscosity of the dispersing medium, in that the dispersion applied to a surface has a tendency to shrink away from sharp edges and corners, and in that films prepared from such dispersions have a tendency to "mud-crack" in the production of films. The term "mud-cracked" is used to designate the condition of a coating which resembles in appearance the cracks in dried mud in that it has interlacing channel voids.

In the dip coating or flow coating of pipe, for example, the aforementioned dispersions run off easily, in a phenomenon known as "rivering" or "channeling," to leave relatively large areas uncoated.

Another disadvantage of the aforementioned dispersions lies in the fact that the resinous particles remaining on the surface, after the drying of the dispersant and prior to fusion, may be shaken off or blown off the surface very easily. This tendency makes coating operations difficult as a practical matter without the addition of an ingredient to serve as a particle cement. Prior to this invention, it has been necessary, for practical coating operations, to add substantial amounts, of the order of about 25 weight per cent of trifluorochloroethylene polymer wax to serve as a particle cement and prevent the shaking off or blowing off of the resinous particles.

It is an object of this invention to produce dispersions of trifluorochloroethylene polymers which will produce relatively thick films without "mud cracking."

It is a further object of this invention to prepare dispersions of trifluorochloroethylene polymers for use in knife or spreader coating of materials, such as fabrics or paper.

It is a further object of this invention to produce films from dispersion which show less tendency to shrink away from sharp edges or corners.

It is a further object of this invention to improve the cohesion of unfused deposits from dispersions of trifluorochloroethylene polymers without the use of large amounts of extraneous materials.

It is a further object of this invention to produce dispersions of trifluorochloroethylene polymers wherein the settling rate of the polymer particles is reduced.

These and other objects are achieved by preparing a dispersion which comprises a resinous polymer of trifluorochloroethylene containing from 0 to about 15 mol percent of a comonomer copolymerizable with trifluorochloroethylene dispersed in a solution of a copolymer of trifluorochloroethylene with a hydrogen-containing halogenated olefin.

In the aforementioned dispersions the resinous polymer most commonly used is the homopolymer of trifluorochloroethylene. In some instances it is desirable to use small quantities of the order of less than about 15 mol percent of other monomers, such as vinyl chloride, vinylidene fluoride, tetrafluoroethylene, perfluoropropene and acrylonitrile, in combination with the principal monomer trifluorochloroethylene, in order to impart modified characteristics to the resulting polymer. One of the preferred copolymers of this type is that wherein the trifluorochloroethylene is copolymerized with not more than about 5 mol percent of vinylidene fluoride.

The resinous polymer is generally included in the dispersions of this invention in proportions ranging from 25 to 65 weight percent, based on total weight of the dispersion, and preferably from 30 to 40 weight percent.

The soluble copolymers used in accordance with this invention preferably contain only as much of the hydrogen-containing halogenated olefin to produce the desired solubility. The resinous polymer of trifluorochloroethylene is compatible with all copolymers of trifluorochloroethylene with hydrogen-containing halogenated olefins, but the chemical resistance of the resultant films are least affected when the copolymer has a high halogen content. Trifluorochloroethylene may be copolymerized with vinylidene fluoride, vinyl fluoride, vinylidene chloride, vinyl chloride, trifluoroethylene and other hydrogen-containing halogenated olefins.

Of the copolymers described above, those prepared by copolymerizing trifluorochloroethylene with vinylidene fluoride have been found to be generally superior insofar as the balance between the solubility and other properties is concerned, and represent the preferred copolymer of this invention. Hence, the invention will be illustrated by particular reference to this copolymer system, although it is to be understood that the dispersions of this invention may include any of the copolymer systems described above which may be prepared by employing equivalent polymerization recipes.

The copolymers which go into the solute phase of the dispersions of this invention are prepared by the procedure given below using the indicated water-suspension type recipe.

EXAMPLE I

|  | Parts by weight |
|---|---|
| Water, distilled | 200. |
| $CF_2=CFCl$ | [1] 92.2 |
| $CF_2=CH_2$ | [1] 7.8 |
| $(NH_4)_2S_2O_8$ | 2.0 |
| $Na_2S_2O_5$ | 0.8 |
| $FeSO_4 \cdot 7H_2O$ | 0.2 |

[1] 86/14 molar.

Catalyst and activator solution was prepared by dissolving 2 parts of $(NH_4)_2S_2O_8$ in 20 parts of water. Next, 0.8 part of $Na_2S_2O_5$ were dissolved in another 20 parts of water. In still another 20 parts of water, 0.2 part of $FeSO_4 \cdot 7H_2O$ was dissolved. 140 parts of water were next charged to a silver-lined steel bomb. The aforementioned $(NH_4)_2S_2O_8$, $Na_2S_2O_5$, and the $FeSO_4 \cdot 7H_2O$ solutions were then added in succession. The contents of the bomb were frozen after each addition. The bomb was then closed and evacuated. Thereafter, 92.2 parts of $CF_2=CFCl$ and 7.8 parts of $CF_2=CH_2$ were flash-distilled into it. The bomb was then rocked at 20° C. over a period of 18 hours. The residual monomer was then vented from the bomb and a mixture of water and particles of resinous polymer were discharged. These particles were washed with hot water to remove residual salts, and were then dried in vacuo at room temperature. The mol percent of $CF_2=CFCl$, combined in the resulting copolymeric product, was 75 percent.

EXAMPLE II

|  | Parts by weight |
|---|---|
| Water, distilled | 200. |
| $CF_2=CFCl$ | [1] 64.5 |
| $CF_2=CH_2$ | [1] 35.5 |
| $K_2S_2O_8$ | 1.0 |
| $Na_2S_2O_5$ | 0.4 |
| $FeSO_4 \cdot 7H_2O$ | 0.1 |

[1] 50/50 molar.

Catalyst and activator solution was prepared by dissolving 1 part of $K_2S_2O_8$ in 20 parts of water. In still another 20 parts of water, 0.1 part of $FeSO_4 \cdot 7H_2O$ was dissolved. 140 parts of water were next charged to a silver-lined steel bomb. The aforementioned $K_2S_2O_8$, $Na_2S_2O_5$, and the $FeSO_4 \cdot 7H_2O$ solutions were then added in succession. The contents of the bomb were frozen in succession. The bomb was then closed and evacuated. Thereafter, 64.5 parts of $CF_2=CFCl$ and 35.5 parts of $CF_2=CH_2$ were flash-distilled into it. The bomb was then rocked at room temperature (between about 25° C. and about 35° C.) for a period of 24 hours. The residual monomer was then vented from the bomb and a mixture of water and chunks of rubbery polymer were discharged. These chunks were washed with hot water to remove residual salts, and were then dried in vacuo at room temperature. The mol percent of $CF_2=CFCl$ combined in the resulting copolymeric product was 49 percent.

The above examples illustrate the preparation of a trifluorochloroethylene-vinylidene fluoride copolymer wherein the mol ratio is 75/25 and 50/50 respectively. By varying monomer feed ratios, copolymers of different mol compositions are prepared.

The solubility of the copolymer is dependent on the mol concentration of trifluorochloroethylene. As the mol concentration of trifluorochloroethylene increases, the solubility decreases. For example, copolymers of trifluorochloroethylene and vinylidene fluoride which contain above 95 mol percent of trifluorochloroethylene are substantially insoluble in all solvents and, in fact, may be used as the resinous polymer in the solute phase of the dispersions of this invention. Copolymers which contain below about 80 mol percent of trifluorochloroethylene have a high degree of solubility in certain of the solvents listed below, such as, in cyclic ethers. Copolymers containing less than about 75% of trifluorochloroethylene have a high solubility in esters, ketones and other liquids listed below.

The selection of a suitable soluble copolymer and the selection of a suitable liquid dispersant are interdependent. The liquid selected must be a non-solvent for the resinous polymer of trifluorochloroethylene and a solvent for the copolymer of trifluorochloroethylene with the hydrogen-containing halogenated olefin. In addition, it must have whatever surface tension, volatility, and other properties which would make it suitable for the use intended.

The property of being a non-solvent for the resinous polymer of trifluorochloroethylene presents no problem in the selection of a liquid dispersant, since there is no known liquid which is a solvent for the resinous polymer at room temperatures. A suitable liquid dispersant may be selected on the basis of its solubility for a particular copolymer, or a suitable copolymer of trifluorochloroethylene with a hydrogen-containing halogenated olefin may be selected on the basis of its solubility in a particular liquid dispersant. The liquid dispersants include many organic compounds which are commonly used as lacquer solvents. Among the classes of suitable liquid dispersants are the aliphatic and aromatic esters, the ether alcohols, the aliphatic and cyclic ketones, the cyclic ethers, and the nitro paraffins, particularly the halogenated nitro paraffins.

Typical of the aliphatic and cyclic ketones are: diisobutyl ketone, methyl ethyl ketone, methyl isobutyl ketone, cyclohexanone and acetone.

Typical ether alcohols include: methoxy ethanol, ethoxy ethanol, and ethoxy ethoxy ethanol.

Typical of the aliphatic and aromatic esters are: methyl acetate, butyl acetate, amyl acetate, and ethyl benzoate.

Typical of the cyclic ethers are: dioxane, tetrahydrofuran, tetrahydro-2-methyl furan, tetrahydropyran, dioxolane, 2-methyl-1,3-dioxolane, alpha, alpha-dimethylethylene oxide, trimethylene oxide, 2,6-dimethyltetrahydropyran and 2,3-dimethyl-1,4-dioxane.

Typical of the halogenated nitro paraffins are: 1-chloro-1-nitro propane, and 1,1-dichloro-1-nitro propane.

Copolymers added to the dispersion in accordance with this invention are added in such quantity that they produce a minimum change in the properties of the film produced by the major solid polymer present, but are present in sufficient quantity to control the viscosity of the dispersion media. It is desirable to keep the quantity of soluble copolymer additive at as low a percentage as possible while maintaining a relatively high viscosity of the finished dispersion to reduce settling of the solid materials and to reduce running, channeling and shrinking of the film in dipping, spreader or knife coating, and similar methods of application.

For the purpose of this invention, copolymer additions of between about .025% to about 25%, based on the total solids, or combined weight of resin and copolymer, have been found satisfactory. The preferred range of copolymer addition is between 2% and 6%. The total solids comprise between 20 and 60 weight percent of the dispersion, and preferably about 40 percent.

In general, the dispersions of this invention may be prepared by charging all of the ingredients together to a pebble mill and milling for about 20 to 60 hours. Another method of prepartion consists of dispersing the resinous trifluorochloroethylene in the dispersion media by milling in a pebble-mill; then adding a solution of the copolymer, which has been dissolved in a separate portion of the dispersion media, and agitating the mixture by simple mechanical or other suitable stirring. A third method which may be employed in the preparation of these dispersions consists of dissolving the copolymer in all of the dispersion medium, followed by the addition of the resinous polymer, and milling to obtain a suitable dispersion. In general, it is desirable to mill in the pebble mill for as short a period of time as possible. It has been found that increasing the milling time over that necessary to obtain a good dispersion results in a gradual decrease in the apparent molecular weight of the final film deposited from the dispersion. The dispersion should be milled until the particle size of the solid polymeric material approaches an average size of about 0.1 to 15 microns. It is preferred to mill until the average particle size is within the range of 3 to 10 microns.

In addition to the resinous polymer, the soluble copolymer and the suitable liquid dispersant, discussed above, the dispersions of this invention may include other ingredients, and particularly ingredients which have been included in prior art dispersions. For example, in addition to the dispersing medium which is a solvent for the copolymer, a liquid diluent may be added. The preferred diluent is an aromatic hydrocarbon, such as xylene, toluene, or benzene. Hydrocarbon fractions containing a relatively large amount of aromatic hydrocarbons are also suitable as the preferred diluent, such fractions being naphthas and petroleum distillates. Although the aromatic compounds are much preferred as diluents to be employed together with the dispersant as the liquid suspending medium, certain other compounds may be employed as diluents. These other compounds include the aliphatic alcohols having two or more carbon atoms per molecule, unsubstituted ethers such as dibutyl ether, and relatively high boiling hydrocarbon fractions such as those boiling above about 150° C. Mixtures of alcohol and water in a volume ratio of about 1:1 to about 1:5 have been found suitable as diluents for the dispersant. The weight ratio of dispersant to diluent is in the range of about 1:2 to about 1:25, preferably in the range of about 1:2 to 1:10.

In addition, lower molecular weight polymers of trifluoro-chloroethylene, normally in the liquid or waxy range, may be added. These lower polymers are not required, as in prior art dispersions, to serve as particle cements; however, they may be added when it is desired to modify the characteristics of the final baked film by plasticization. Other plasticizers, such as dioctyl phthalate and tricresyl phosphate may also be added.

In addition, other finely-divided solid materials, such as fillers or pigments, may be added. Fillers may be added to the completed dispersion with gentle stirring or by addition prior to the grinding operation in the pebble mill. Examples of stable fillers are calcium silicate, calcium carbonate, carbon black, titanium dioxide, etc., with particle dimensions of approximately 0.5 micron in diameter. Pigments such as the phthalocyanines and chrome green can also be incorporated in the polytrifluorochloroethylene dispersions of this invention.

In order to better understand the operation of this invention, the following examples are given as illustrative, but not limiting:

EXAMPLE III 90 pounds of micropulverized trifluorochloroethylene resin, having a no strength temperature (NST) of 300° C., were placed in a 130 gallon pebble mill and dry milled with flint pebbles (with external cooling of the pebble mill in order to maintain the temperature) until not less than 40% of the ground powder would pass through a 325 mesh sieve. This operation required about 90 hours. At the end of the dry milling, the following materials were charged into the 130 gallon pebble mill (without removing the pulverized solid polymeric trifluorochloroethylene): 4.5 pounds of a copolymer of trifluorochloroethylene and vinylidene fluoride, containing 59 mil % trifluorochloroethylene; 180 lbs. of methyl ethyl ketone; 175.5 lbs. of xylene. The entire mixture was then wet milled in the pebble mill for 60 hours at room temperature. External cooling was again employed when necessary to control the temperature of the material being ground.

The composition of the resulting dispersion was as follows:

| | Percent |
|---|---|
| Soluble copolymer | 1 |
| Trifluorochloroethylene polymer | 20 |
| Methylethyl ketone | 40 |
| Xylene | 39 |

This dispersion dried rapidly and had improved viscosity characteristics over comparable dispersions without the soluble copolymer. Coating (brush, or dip) could be applied up to thicknesses of 5 to 8 mils and fused without developing mud cracks.

EXAMPLE IV

In this example all the materials were charged to the pebble mill at the same time without any previous dry milling of the plastic polymeric trifluorochloroethylene. The pebble mill was charged with 5.5 pounds of a copolymer of trifluorochloroethylene with vinylidene chloride containing 66 mol % of trifluorochloroethylene; 84.5 pounds of polymeric micropulverized trifluorochloroethylene; 135 pounds of methylethyl ketone; 112.5 pounds of ethyl acetate and 112.5 pounds of amyl acetate. The charge was then wet milled for 60 hours at room temperature. This dispersion had the following percentage composition:

| | Percent |
|---|---|
| Soluble copolymer | 1.25 |
| Trifluorochloroethylene polymer | 18.75 |
| Methyl ethyl ketone | 30 |
| Ethyl acetate | 25 |
| Amyl acetate | 25 |

The dispersion had characteristics similar to those of the dispersion of Example III, but had a slower drying rate.

A comparison of the properties of the dispersions prepared according to Examples III and IV with a commercially used dispersion which did not contain soluble copolymer additives, is shown in Table I. The commercial dispersion was prepared by charging 40% of methyl ethyl ketone and 20% of micropulverized polymeric trifluorochloroethylene to a ball mill and grinding with flint pebbles for about 65 hours at room temperature.

Table I

| Properties | Com'l Dispersions | Ex. 3 | Ex. 4 |
| --- | --- | --- | --- |
| Settling Rate [1] | 20 ml. in 2 hrs. | 5 ml. in 2 hrs. | 3 ml. in 2 hrs. |
| Coating thickness (prior to fusion). | 1–1.5 mil | 5–8 mil | 5–8 mil. |
| Coating texture | Powdery—no cohesion. | Powdery—cohesive. | Powdery—cohesive. |
| Fusion of thick film | Mr'd cracks | No cracks | No cracks. |
| Fabric coating | Wicks out | Non-wicking | Non-wicking. |

[1] The settling rate was determined by allowing a sample of the freshly prepared dispersion (in a standard cylinder) to stand for 2 hrs. and then measuring the height of clear, supernatant liquid above the dispersion. The settling rate after the first 2 hrs. is relatively very slow.

EXAMPLE V 50 parts by weight of micropulverized polymeric trifluorochloroethylene, 135 parts by weight of acetone, 45 parts of butyl acetate and 3 parts of a copolymer containing 56 mol. percent of vinylidene fluoride and 44 mol. percent of trifluorochloroethylene were charged together in a 1-gallon pebble mill and wet milled with flint pebbles for 65 hours at room temperature. The composition of the dispersion was as follows:

|   | Percent |
| --- | --- |
| Soluble copolymer | 1.3 |
| Polymeric trifluorochloroethylene | 21.4 |
| Acetone | 58.0 |
| Butyl acetate | 19.3 |

The dispersion was easily applied by brushing and it was possible to apply two or more coatings of the dispersion without baking between coatings. The coating, even before baking, was abrasion resistant and could be removed from an object as a film rather than a dust or powder.

EXAMPLE VI 40 parts (by weight) of micropulverized polymeric trifluorochloroethylene, 80 parts acetone, 80 parts monoethyl ether and 4 parts of the copolymer used in Example V were charged to a pebble mill and wet milled with flint pebbles for 65 hours at room temperature. The composition of the dispersion was as follows:

|   | Percent |
| --- | --- |
| Soluble copolymer | 2.0 |
| Polymeric trifluorochloroethylene | 19.6 |
| Acetone | 39.2 |
| Ethylene glycol monoethyl ether | 39.2 |

The resulting dispersion had characteristics very similar to those observed in Example V.

EXAMPLE VII 51.5 parts (by weight) of micropulverized polymeric trifluorochloroethylene, 55 parts of butyl acetate, 70 parts of butyl lactate and 3.5 parts of the copolymer used in Example V were charged to a pebble mill and wet milled with flint pebbles for 65 hours at room temperature. The final dispersion had the following percentage composition:

|   | Percent |
| --- | --- |
| Soluble copolymer | 1.9 |
| Polymeric trifluorochloroethylene | 28.6 |
| Butyl acetate | 30.6 |
| Butyl lactate | 38.9 |

This dispersion gave a smooth brush coating. By drying at 190° C. between coatings, up to 10 brush coatings were applied before fusing the film.

By means of this invention for making stable dispersions, it is possible to overcome certain difficulties previously encountered, such as channeling of the dispersion when dip coating, lack of cohesion of dried deposits after coating, and tendency of thick films to mud crack. Dispersions of the type described in this invention are more suitable for use in knife or spreader coating of fabrics and papers due to more even distribution of the film over the surface. Dispersions of this character find particular use in the coating of glass fabrics and of asbestos papers to increase their electrical resistance and their chemical resistance, and to provide an impermeable surface.

Dispersions prepared according to this invention are stable for long periods of time, especially when the viscosity of the dispersion is correctly adjusted by the incorporation of the copolymer to increase the viscosity of the other agents in the dispersion media. In addition, even if the dispersion does settle, it is possible, by simple stirring or agitation, to return it to its original useable form without any deterioration in quality of the dispersion.

The dispersions of this invention are particularly adapted for spread coating, dip coating and flow coating purposes. In the spread coating of glass cloth, for example, the dispersion is utilized at high viscosity of the order of about 40% solids, and applied as a relatively thick coating by knife coating techniques. The knife should be adjusted to spread a uniform layer which fuses to a 2 to 3 mil thick film. Each coat should be dried and baked. It is advantageous to apply pressures of 500 to 1000 p. s. i. to the coated cloth to reduce the baking time from hours to minutes. Heated rolls or platens may be used and the pressure may be applied to each individual coat or after several coats have been built up to the desired thickness.

Dip and flow coatings preferably utilize dispersions of somewhat lower viscosity of the order of about 35% solids. Dispersions of a higher solids content may be thinned out by the addition of more of the same dispersant, or may be thinned out with another dispersant. An amyl acetate dispersion may, for example, be thinned out with acetone, if greater volatility is desired. The thinned dispersion will ordinarily deposit coatings which fuse to about 2 mils by either dip or flow coating.

The thinned dispersion should be kept well spread during the dip or flow coating operation.

Objects to be dip or flow coated should be constructed so that proper drainage is provided and an excessive amount of material will not be deposited, for example, on flat recess.

The speed of withdrawal of an object from the dipping tank should be such that the coating does not sag. The rate of withdrawal of a ⅜″ diameter rod, for example, is about 12″ per minute.

In flow coating the interior of a pipe, for example, the dispersion is forced up into the vertical pipe by pressurizing the dispersion in a pressure tank. By depressurizing the tank slowly the dispersion will be drained from the pipe back into the pressure tank.

The baking or fusion operation takes place preferably at a temperature between 250 and 270° C. and for a total period ranging from 10 hours at the higher temperatures to 18 hours at the lower temperatures. The total baking period includes the intermediate bakes and the final bake. Intermediate bakes generally run from one-half to one hour at the lower temperatures, or one-quarter to one-half hour at the higher temperatures.

The air dried coating is white and opaque. It starts becoming clear and transparent after the substrate and coating have reached a temperature of 211° C. The time at which the coating becomes clear and transparent may be considered as the beginning of the intermediate bake. The time of the final bake at 250° C. or 270° C. is the difference between 18 hours or 10 hours, respectively, and the total time for the intermediate bakes.

I claim:

1. A solid-in-liquid dispersion which comprises particles of a resinous polymer of trifluorochloroethylene containing at least 85 mole percent of trifluorochloroethylene dispersed in an organic solvent in which is dissolved a copolymer of trifluorochloroethylene with a hydrogen containing olefin selected from the group consisting of vinylidene fluoride, vinyl fluoride, vinylidene chloride, vinyl chloride and trifluoroethylene, said copolymer containing less than about 80 mole percent of trifluorochloroethylene and being present in an amount between about 0.25% and 25% of the combined weight of the resinous polymer and the copolymer, the combined weight of the resinous polymer and the copolymer being between 20 and 60 weight percent of the dispersion and said organic solvent being selected from the group consisting of an aliphatic ester, a cyclic ether, a halogenated nitro paraffin, an aliphatic ketone, and an ether alcohol.

2. The dispersion of claim 1 wherein the resinous polymer is a homopolymer of trifluorochloroethylene.

3. The dispersion of claim 1 wherein the resinous polymer is a copolymer of trifluorochloroethylene with vinylidene fluoride containing not more than about 5 mol percent of vinylidene fluoride.

4. The dispersion of claim 1 wherein said copolymer in solution is a copolymer of trifluorochloroethylene with vinylidene fluoride containing between about 20 and 80 mol percent of vinylidene fluoride.

5. A solid-in-liquid dispersion which comprises particles of a resinous polymer of trifluorochloroethylene containing at least 85 mole percent of trifluorochloroethylene dispersed in an aliphatic ester in which is dissolved a copolymer of trifluorochloroethylene with a hydrogen containing olefin selected from the group consisting of vinylidene fluoride, vinyl fluoride, vinylidene chloride, vinyl chloride and trifluoroethylene, said copolymer containing less than about 75 mole percent of trifluorochloroethylene and being present in an amount between about 0.25% and 25% of the combined weight of the resinous polymer and the copolymer, the combined weight of the resinous polymer and the copolymer being between 20 and 60 weight percent of the dispersion.

6. The dispersion of claim 5 in which the resinous polymer is a homopolymer of trifluorochloroethylene.

7. The dispersion of claim 5 in which the aliphatic ester is butyl acetate.

8. The dispersion of claim 5 in which the aliphatic ester is amyl acetate.

9. The dispersion of claim 5 in which the copolymer in solution comprises a copolymer of trifluorochloroethylene with vinylidene fluoride containing between about 20 and 80 mol percent of vinylidene fluoride.

10. The dispersion of claim 5 in which the copolymer in solution comprises a copolymer of trifluorochloroethylene with vinylidene fluoride containing between about 20 and 80 mol percent of vinylidene fluoride, wherein the copolymer is present in amounts sufficient to form 2 to 6 wt. percent based on the combined weight of resin and copolymer.

11. A solid-in-liquid dispersion which comprises particles of a resinous polymer of trifluorochloroethylene containing at least 85 mole percent of trifluorochloroethylene dispersed in a cyclic ether in which is dissolved a copolymer of trifluorochloroethylene with a hydrogen containing olefin selected from the group consisting of vinylidene fluoride, vinyl fluoride, vinylidene chloride, vinyl chloride and trifluoroethylene, said copolymer containing less than about 80 mole percent of trifluorochloroethylene and being present in an amount between about 0.25% and 25% of the combined weight of the resinous polymer and the copolymer, the combined weight of the resinous polymer and the copolymer being between 20 and 60 weight percent of the dispersion.

12. The dispersion of claim 11 in which the cyclic ether is tetrahydrofurane.

13. A solid-in-liquid dispersion which comprises particles of a resinous polymer of trifluorochloroethylene containing at least 85 mole percent of trifluorochloroethylene dispersed in a halogenated nitro paraffin in which is dissolved a copolymer of trifluorochloroethylene with a hydrogen containing olefin selected from the group consisting of vinylidene fluoride, vinyl fluoride, vinylidene chloride, vinyl chloride and trifluoroethylene, said copolymer containing less than about 75 mole percent of trifluorochloroethylene and being present in an amount between about 0.25% and 25% of the combined weight of the resinous polymer and the copolymer, the combined weight of the resinous polymer and the copolymer being between 20 and 60 weight percent of the dispersion.

14. A solid-in-liquid dispersion which comprises particles of a resinous polymer of trifluorochloroethylene containing at least 85 mole percent of trifluorochloroethylene dispersed in an aliphatic ketone in which is dissolved a copolymer of trifluorochloroethylene with a hydrogen containing olefin selected from the group consisting of vinylidene fluoride, vinyl fluoride, vinylidene chloride, vinyl chloride and trifluoroethylene, said copolymer containing less than about 75 mole percent of trifluorochloroethylene and being present in an amount between about 0.25% and 25% of the combined weight of the resinous polymer and the copolymer, the combined weight of the resinous polymer and the copolymer being between 20 and 60 weight percent of the dispersion.

15. A method of coating a surface which comprises applying to the surface a solid-in-liquid dispersion which comprises particles of a resinous polymer of trifluorochloroethylene containing at least 85 mole percent of trifluorochloroethylene dispersed in an organic solvent in which is dissolved a copolymer of trifluorochloroethylene with a hydrogen containing olefin selected from the group consisting of vinylidene fluoride, vinyl fluoride, vinylidene chloride, vinyl chloride, and trifluoroethylene, said copolymer containing less than about 80 mole percent of trifluorochloroethylene and being present in an amount between about 0.25% and 25% of the combined weight of the resinous polymer and the copolymer, the combined weight of the resinous polymer and the copolymer being between 20 and 60 weight percent of the dispersion and said organic solvent being selected from the group consisting of an aliphatic ester, a cyclic ether, a halogenated nitro paraffin, an aliphatic ketone and an ether alcohol, and thereafter drying said dispersion and fusing it at a temperature between about 250° C. and 270° C.

References Cited in the file of this patent

UNITED STATES PATENTS

| | | |
|---|---|---|
| 2,468,054 | Ford | Apr. 26, 1949 |
| 2,686,738 | Teeters | Aug. 17, 1954 |
| 2,789,960 | Smith | Apr. 23, 1957 |

UNITED STATES PATENT OFFICE
CERTIFICATE OF CORRECTION

Patent No. 2,866,721                                    December 30, 1958

Alexander C. Hetherington

It is hereby certified that error appears in the printed specification of the above numbered patent requiring correction and that the said Letters Patent should read as corrected below.

Column 5, line 12, for "about .025%" read — about 0.25% —.

Signed and sealed this 25th day of August 1959.

(SEAL)
Attest:

KARL H. AXLINE                                         ROBERT C. WATSON

Attesting Officer                                       Commissioner of Patents